R. S. MUNGER.
COTTON CLEANER.
APPLICATION FILED SEPT. 4, 1917.

1,311,907.

Patented Aug. 5, 1919.
5 SHEETS—SHEET 2.

Witness
J. Gordon Parkes

Inventor
R. S. Munger
By
Attorney

R. S. MUNGER.
COTTON CLEANER.
APPLICATION FILED SEPT. 4, 1917.
1,311,907.
Patented Aug. 5, 1919.
5 SHEETS—SHEET 4.
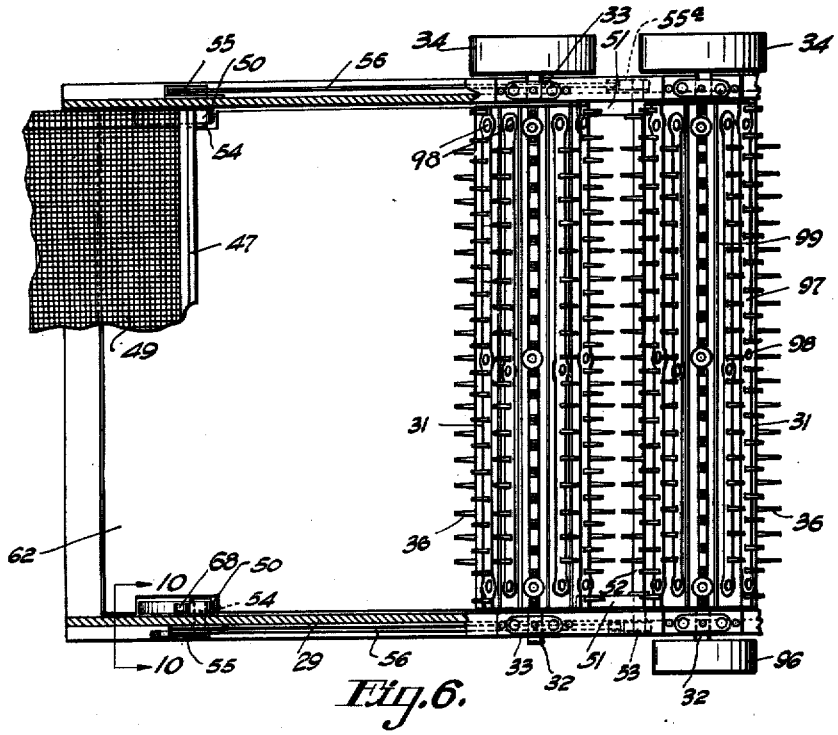
Fig. 6.
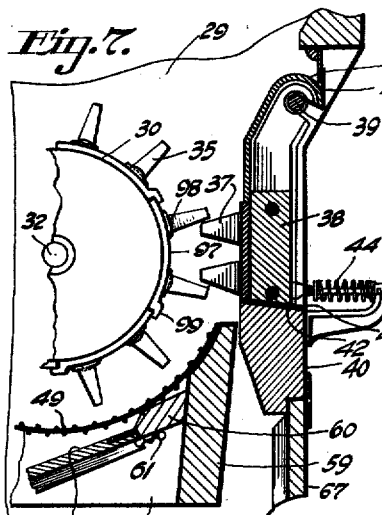
Fig. 7. Fig. 8.
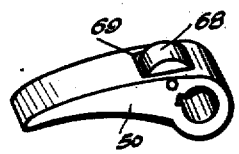
Fig. 9.
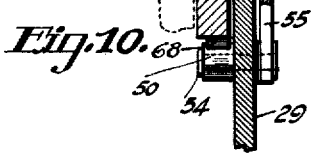
Fig. 10.
Inventor
R. S. Munger
Attorney

R. S. MUNGER.
COTTON CLEANER.
APPLICATION FILED SEPT. 4, 1917.

1,311,907.

Patented Aug. 5, 1919.
5 SHEETS—SHEET 5.

Witness
J. Gordon Hughes

Inventor
R. S. Munger
By
Attorney

UNITED STATES PATENT OFFICE.

ROBERT S. MUNGER, OF BIRMINGHAM, ALABAMA, ASSIGNOR TO CONTINENTAL GIN COMPANY, A CORPORATION OF DELAWARE.

COTTON-CLEANER.

1,311,907.　　　　　　Specification of Letters Patent.　　Patented Aug. 5, 1919.

Application filed September 4, 1917.　Serial No. 189,651.

*To all whom it may concern:*

Be it known that I, ROBERT S. MUNGER, a citizen of the United States of America, residing at Birmingham, in the county of Jefferson and State of Alabama, have invented certain new and useful Improvements in Cotton-Cleaners, of which the following is a specification.

My present invention relates to an apparatus for cleaning cotton and is more especially adapted for use in combination with suction apparatus for feeding cotton to a gin or battery of gins.

A variety of mechanisms have heretofore been employed with varying degress of success to remove sticks, nails, rocks, sand and foreign matter from the cotton before it is fed to the gins, and in these mechanisms, beaters, spiked drums and toothed cylinders have been employed to pass the cotton over screens through which the heavy foreign matter therein was intended to fall and collect in a hopper from which it was removed in any suitable manner. A careful study of the operation of these various cotton cleaning devices has led me to the conclusion that they fail principally for the reason that the cotton is not sufficiently opened up and the cotton locks separated before being passed over the screens responsive to the action of rotating spiked or toothed elements.

One very important object of my invention is to present the cotton to the cleaning agents in the condition in which it can be most effectively acted upon thereby. To this end I provide a spacious cotton opening chamber containing a fast spinning beater, the blades of which receive the incoming mass of cotton near the bottom of the chamber and throw it upwardly and laterally against the walls of the chamber which are substantially spaced from the beater so that the cotton in its flight will have ample time and space in which to open up. This permits the cotton locks to become separated, and much of the foreign matter in the cotton to be separated therefrom, the cotton and foreign matter passing, responsive to a combined gravity and suction feed, from the opening chamber to the cleaning chamber in which a series of rotating spiked or toothed elements receive the cotton locks and pass them over a separating screen. The freed dirt and trash separated from the cotton in the opening chamber will pass directly through the screen under the first cleaning cylinder and will not come in further contact with the cotton while being acted on by the other cylinders.

I have also found that the efficiency of the apparatus can be materially increased by the manner in which air currents are employed to assist in the cleaning operation and to this end the suction system is adapted to draw the cotton from the separating chamber directly against the first of a series of rotating toothed cylinders in the cleaner chamber. The result of this arrangement is that the principal portion of the air currents pass directly with the cotton to the screen under the first toothed cylinder and leave the rest of the cleaner chamber practically free from down drafts that will prevent the lighter or clean cotton locks from floating through the cleaner chamber above the cylinders to the point of cotton discharge while the heavier or dirty cotton locks carrying foreign matter will be caught by the successive toothed cylinders and driven repeatedly over the screen in such manner as to clean it.

I make provision for separating large sized pieces of wood, sticks and the like from the cotton, by grinding them up between the first toothed cylinder and a co-acting yieldable toothed breaker bar so arranged that they receive between them such pieces as they fall from the opening chamber. The tension on the breaker bar is such as to yield only to permit the passage of articles which the co-acting heavy teeth on the breaker bar and first cylinder will not grind up into particles that will pass through the screen.

The air current which flows downwardly through the screen and its hopper and carries with it the dirt and foreign matter caught in the cleaner, is caused to pass through a dust separator so constructed as to separate such heavier foreign matter by centrifugal action from the air current in its passage therethrough. A vacuum feeder is employed to discharge the foreign matter from the bottom of the dust separator.

My invention has for its further objects various improvements designed to simplify and facilitate the handling, and to improve the operation of the cleaning apparatus; such, for instance, as mounting the concave screens under the several toothed cylinders on one bed which can be readily drawn out of the machine for cleaning or repair; the provision of the hopper bottom of the cleaning chamber with a wall that is movable to permit the screen bed to be readily adjusted and removed; the mechanism for adjusting and supporting the screen bed; the construction of the toothed cleaning cylinders; and the mechanism for adjusting the valves which control the feed of cotton to the cleaning apparatus.

My invention also comprises the various novel constructions and arrangements of parts which are more particularly described and pointed out in the claims, and which are illustrated only in their preferred embodiment in the accompanying drawings which form a part of this specification, and in which:—

Fig. 6 is a sectional view taken on the line 6—6 of Fig. 2, and showing in plan the screen supporting means and several of the toothed cylinders of the cleaning chamber, the screen not being in position under the toothed cylinders in this view.

Fig. 7 is a detail view enlarged showing the cleaning chamber as viewed in Fig. 4 broken away to illustrate the first toothed cylinder and the yielding toothed breast in cross section.

Fig. 8 is a partial cross section through one of the toothed cylinders other than the first to act on the cotton.

Fig. 9 is a detail view of one of the lifting cams for the screen.

Fig. 10 is a sectional view taken on the line 10—10 of Fig. 6.

Similar reference numerals refer to similar parts throughout the drawings.

Figure 1:
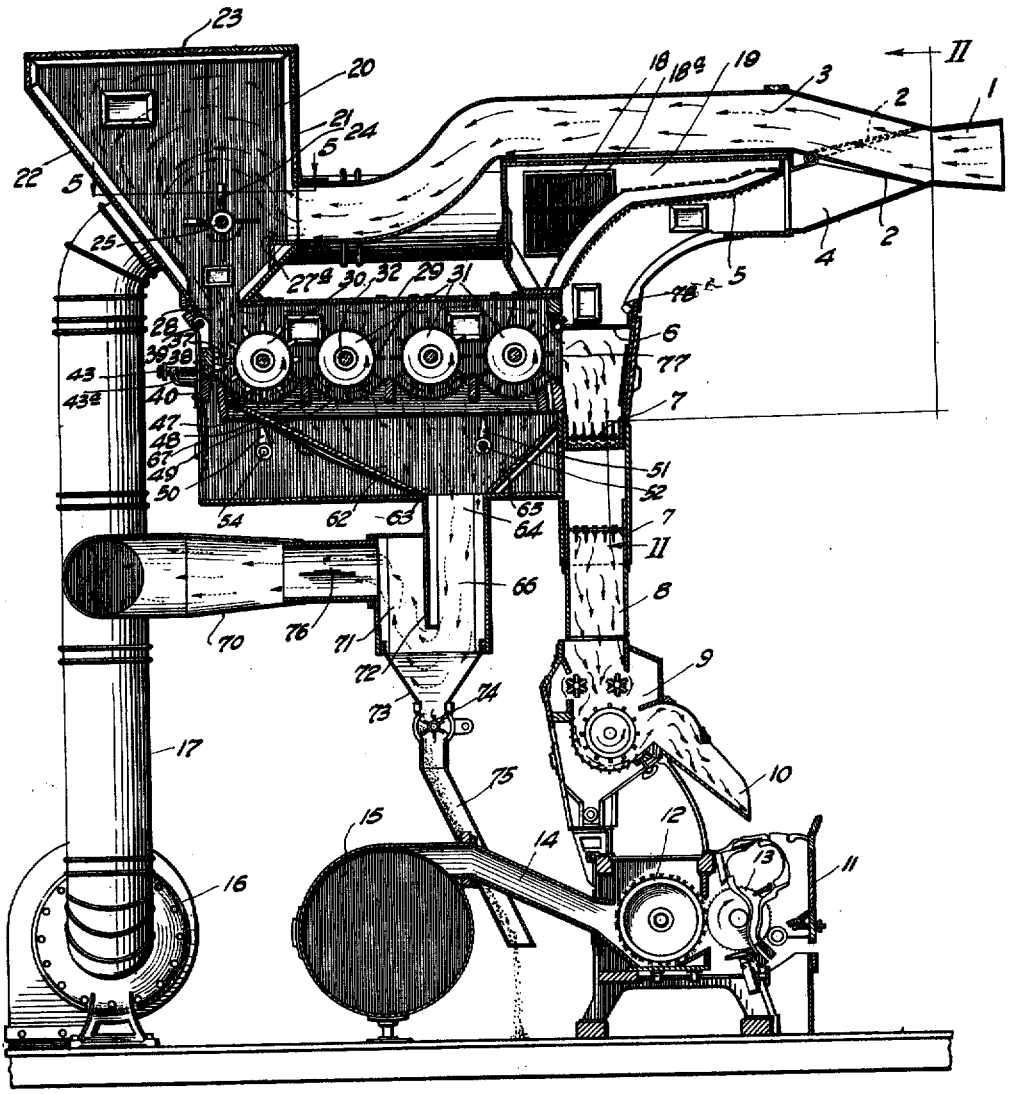
Figure 1 is a vertical sectional elevation through the cotton cleaning apparatus and also through the gin feeding apparatus, the solid line arrows indicating cotton and the dotted arrows indicating air currents.

In the embodiment of my invention illustrated, the cotton passes through the suction pipe 1 from any suitable source and under control of a valve 2 is deflected either to an upper passage 3 or a lower passage 4. When deflected to the lower passage it passes under a separating screen 5 and past an open valve 6 to an endless cotton distributer belt 7 by means of which it is handled in the manner well understood in this art and fed to the pipes 8 whence it enters a cleaning and separating apparatus 9 and is delivered therefrom by a chute 10 to the gin 11. The lint is collected in the gin by a rotary brush 12 from the saws 13 and is fed by blast from brush or fan through pipes 14 and 15 to the tramping and baling apparatus (not shown).

Figure 5:
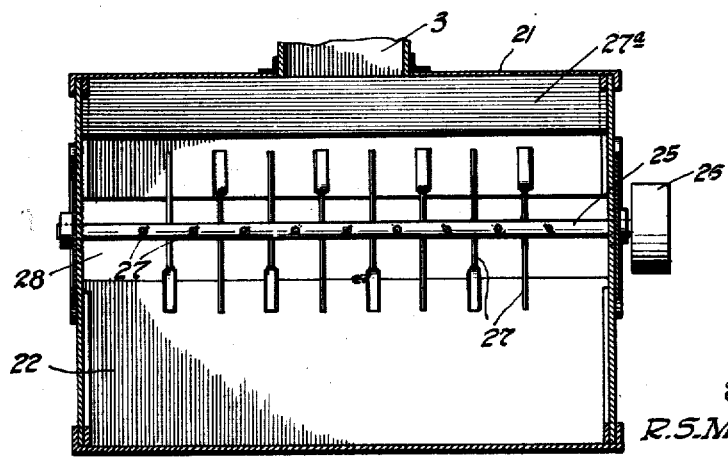
Fig. 5 is a sectional view through the separating chamber taken on the line 5—5 of Fig. 1.

The suction for inducing the flow of cotton through the passages 1 and 4 is induced by the fan 16 having a main suction pipe 17 leading upwardly therefrom and entering through port 18 the chamber 19 in which the screen 5 is located. A valve 18$^a$ is located in the port 18 and provided with a suitable handle 18$^b$. The apparatus as thus far described is that in common use and forms no part of my present invention, which concerns itself with the treatment of the cotton that is deflected by means of the valve 2 into the upper passage 3. This passage extends above the chamber 19 and enters the opening chamber 20 at its lower central portion. This opening chamber comprises an upright front wall 21 and a sloping rear wall 22 connected overhead by a top wall 23 which is spaced substantially above the inlet opening of the passage 3. In the lower contracted portion of the chamber 20 opposite the point of entrance of the cotton I arrange a rapidly rotating beater 24, the detailed construction of which will be better understood by reference to Fig. 5, where it is shown as formed by a rotating shaft 25 mounted in suitable bearings in the end walls of the chamber 20 and driven by an external pulley 26. Two series of beater blades 27 are mounted on the shaft, the blades preferably being flattened at one end and left round at the other ends so that they can be passed through holes drilled diametrically through the shaft. Two rows of blades thus projecting at each end from the shaft provide four longitudinal rows of beaters, the flattened blades being spaced and reversely inclined from the center of the shaft toward the sides of the opening chamber 20 so as to effect a proper lateral distribution of the cotton throughout the whole spacious upper portion of the opening chamber which is much wider than the passage 3. The beater shaft is set slightly above the level of the shelf 27$^a$ over which the cotton flows from the passage 3 before being engaged by the beater blades. The beater is rotated at a high speed and the mass of entering cotton is thrown throughout the spacious opening chamber 20 so that it is completely opened up, the cotton locks are separated from each other and the sand, dirt and foreign matter being largely separated from the cotton. In other words, the cotton is put in condition to be most effectively freed from foreign matter by the main cleaning apparatus which will now be described.

The separated cotton pasess down the rear sloping wall 22 of the opening chamber into the cleaning chamber 29 through a bottom outlet 28. This chamber 29 is horizontally disposed, its upper portion being formed by removable sections having diagonal side joints which permit ready access to the toothed cleaning cylinders 30 and 31 which are mounted in the upper portion of the chamber with their axes lying preferably in a horizontal plane. Each toothed cylinder is mounted upon its respective shaft 32 which passes through suitable bearings 33 therefor in the sides of the cleaning chamber and each of the shafts is driven by its respective pulley 34, all of which are disposed on the same side of the casing 29.

The cylinder 30 which acts upon the entering cotton has teeth 35 (see Fig. 7) which are made substantially heavier and stronger than the teeth 36 carried by the cylinders 31. The teeth 35 co-act with and pass between heavy teeth 37 which are mounted upon a breaker bar 38 pivotally mounted to swing from an overhead bolt 39 in the rear end wall 40 of the cleaner casing 29. The bottom edge of the breaker bar engages a packing strip 41 on the seat 42 provided therefor, the packing being adapted to permit the bar to be set at the desired adjustment relative to the cylinder 30. A bolt 43 is hinged to the bar and projects through an opening in the bracket 43ª. A coiled spring 44 surrounds the bolt between the bar 38 and the bracket and presses the bar to closed position. A hand wheel 44ª and a wing nut 44ᵇ are screwed on the outer end of the bolt 43 beyond the bracket and by engaging the latter serve as a stop to limit the inward movement of the bar. The upper edge of the bar is rounded at 45 so as to maintain a tight joint with a rubber strip 46. Similar rubber strips serve to seal the side joints between the bar and casing 29.

Below the several toothed cylinders is a screen bed 47 formed of vertical side boards cross connected and braced by bars 48. Between the bars 48 the top edge of these boards are cut away to form four concave screen pockets 49, one under each of the toothed cylinders. The screen bed is normally supported in raised position on two pairs of cams 50 and 51 which are disposed under the sides of the bed. The cams 51 are fast on a shaft 52 which extends across the lower portion of the cleaning casing 29 and is mounted to turn in suitable bearings 53. The cams 50, as shown in Fig. 10, are each mounted fast on its respective overhung bearing pin 54 mounted to turn in suitable bearings in the side walls of the casing 29. Fast on the outer end of each pin 54 without the casing is a crank 55. Each crank 55 is connected by a rod 56 to a similar crank 55ª made fast on the adjacent end of the cam shaft 52, and one of these cranks 55 is connected by a bar 56ª to an operating handle 57 which in turn is pivoted to a bracket 57ª on the casing 29, and by means of which all four cams can be moved in unison to raise or lower the screen bed. A stop 58 when engaged by a crank 55ª serves to limit the lifting movement of the cams as they act to raise the screen bed and a bolt 58ª serves to lock the handle 57 in position with the screen bed raised. The rear end wall 59 of the screen bed, as seen in Fig. 7, has a cross batten 60 connected thereto and carrying several rotatable catches 61 which are adapted to engage the upper edge of the rear sloping hopper wall 62 and support it with its lower edge bearing against a stop 63 (see Fig. 1) on the bottom of the cleaning chamber at the rear edge of the opening 64 therein. The fixed sloping front wall 65 with the wall 62 and the side walls of the cleaning casing 29 form a hopper under the screen which receives the foreign matter separated from the cotton and delivers same to a dust separator 66. The rear wall of the casing 29 is provided with a door 67 hinged and adapted to open outwardly and upwardly and through this door access is had to release the catches 61 so that the hopper bottom wall 62 will drop to the floor of the casing 29, its side walls being notched to pass the pins 54 and cams 50. The several cams can now be turned by lever 57 to lower the screen bed 47 into position to be drawn out through the door 67 in the manner shown in Fig. 2. In order to facilitate the easy handling of the screen bed, the cams 50, as shown in Fig. 9, have rollers 68 mounted to rotate in sockets 69 from which the periphery of the roller projects. The rollers are located in such position that when the cam is in lowered position (see Figs. 2 and 10), the bottom edge of the sides of the screen bed will ride on the rollers and thus can be easily shifted into and out of the cleaning casing.

In order to feed the cotton through the passage 3 and opening chamber so that it falls between the cylinder 30 and breaker bar 31, I provide a branch pipe connection bar 70 leading from the main suction pipe 17 and connected to the upper portion of the return flue 71 in the dust box 66 formed by a transverse vertical wall or partition 72. This partition stands above a hopper 73 having its bottom discharge normally closed by a rotating vacuum valve and ejector 74 which serves the double purpose of preserving the vacuum and discharging the foreign matter as it collects in its pockets into the discharge pipe 75, which is open to the atmosphere. A valve 76 is provided in the suction pipe 70.

Figure 3:
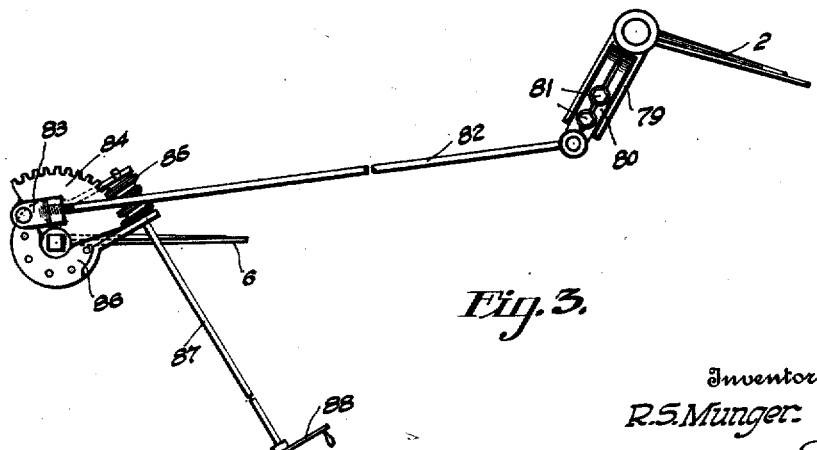
Fig. 3 is a detail view of the valve operating mechanism utilized to admit the cotton to or divert it from the cleaning apparatus.
Figure 11:
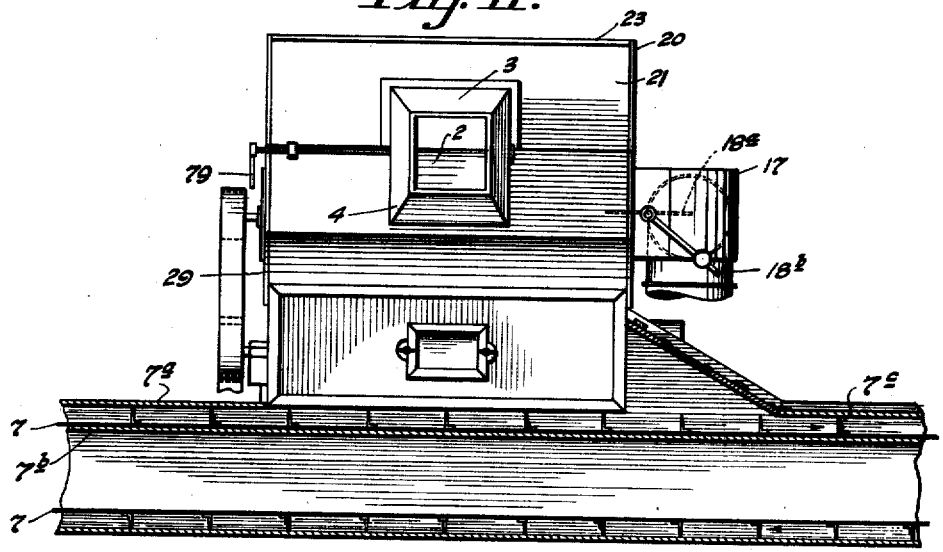
Fig. 11 is a sectional view on the line 11—11 of Fig. 1.
Figure 12:
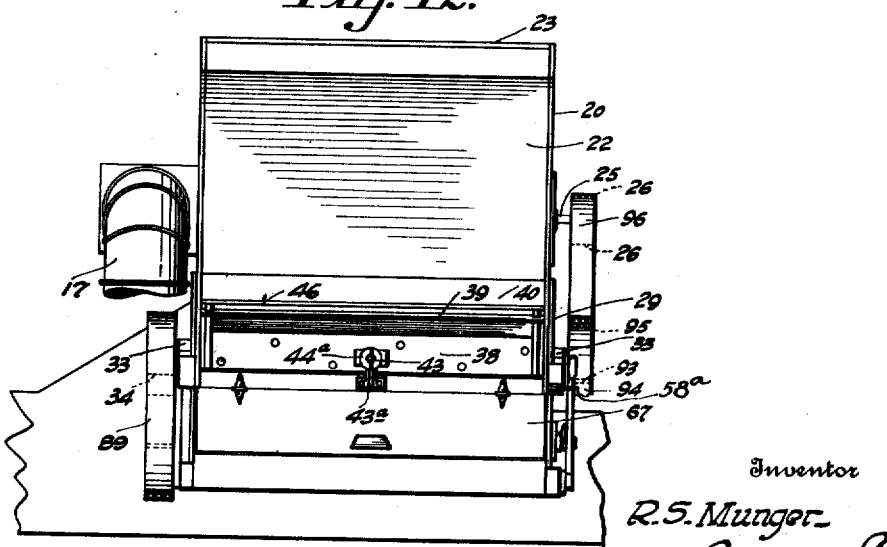
Fig. 12 is a rear end view of the cleaner casing.

The cleaning casing 29 has at its forward end an opening 77 through which the cleaned cotton enters the passage 4 above the distributer 7. This opening 77 is controlled by the valve 6. As seen in Fig. 3, the valves 2 and 6 are coördinated so that when the valve 2 is lowered to divert cotton through passage 3 and the cleaner, the valve 6 is raised to engage a seat 78 in the passage 4, in which position it permits the clean cotton to return from the cleaner through the opening 77 and fall on the distributer 7 and at the same time valves off the overhead suction in pipe 4 to prevent it interfering with the delivery of the cotton to the distributer. As seen in Fig. 11 the distributer is formed by an endless belt moving in an elongated casing 7ª, the upper flight of the belt passing over a horizontal wall 7ᵇ which forms a partition extending short of the ends of the casing 7ª. The upper flight of the distributer belt passes over this partition 7ᵇ and at intervals carries flexible valve strips 7ᶜ so spaced that several of them will be moving in contact with the top wall of the casing 7ª on each side of the port 77, thereby preventing the vacuum being broken to the cleaning chamber through the port 77 when open.

The means for coördinating the valves 2 and 6 comprise a crank arm 79 rigid with the valve 2 and recessed longitudinally to form a slide seat for a slotted arm 80 which is held in proper adjusted position therein by bolts 81 and is pivotally connected to a rod 82, the free end of which is screwed into an arm 83 pivoted on a sector gear 84 rigidly connected to the valve 6. A worm gear 85 is mounted in suitable bearings 86 and adapted to be turned by a shaft 87 extending downwardly to a point where the crank 88 thereon can be operated from the gin floor. The sliding connection between the parts 79 and 80 permits all necessary adjustment to make the valves seat properly in both of their operating positions.

Figure 2:
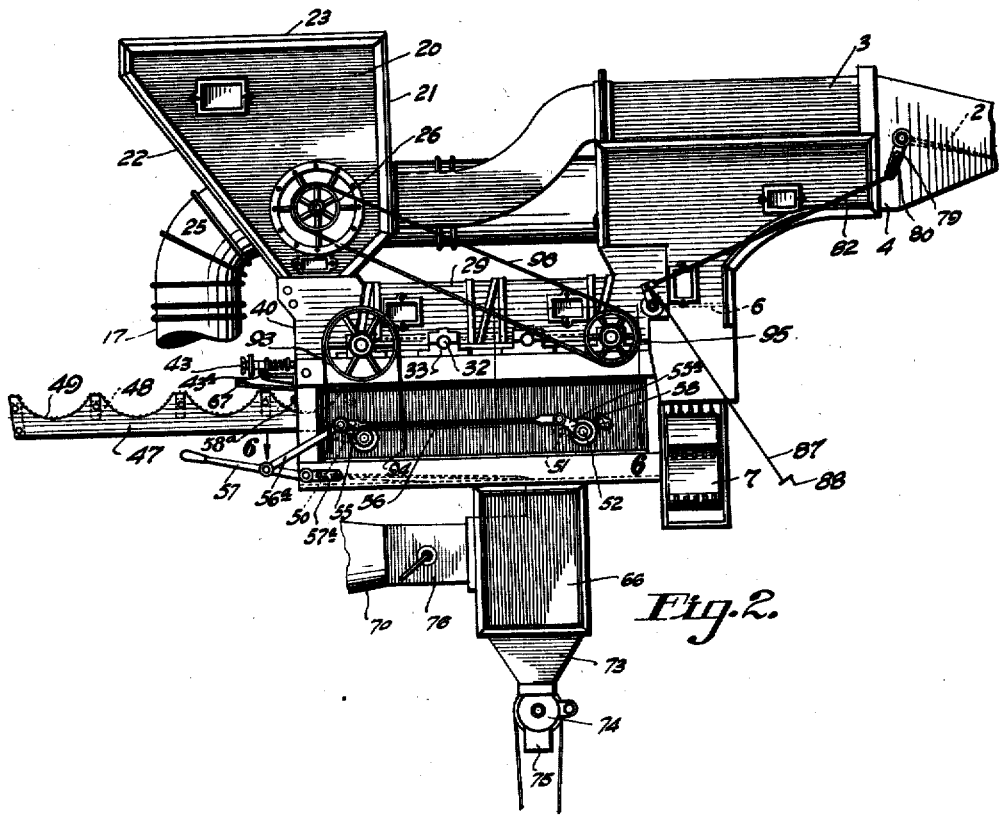
Fig. 2 is a side elevation of the cleaning apparatus showing the screen bed withdrawn for inspection or repair.
Figure 4:
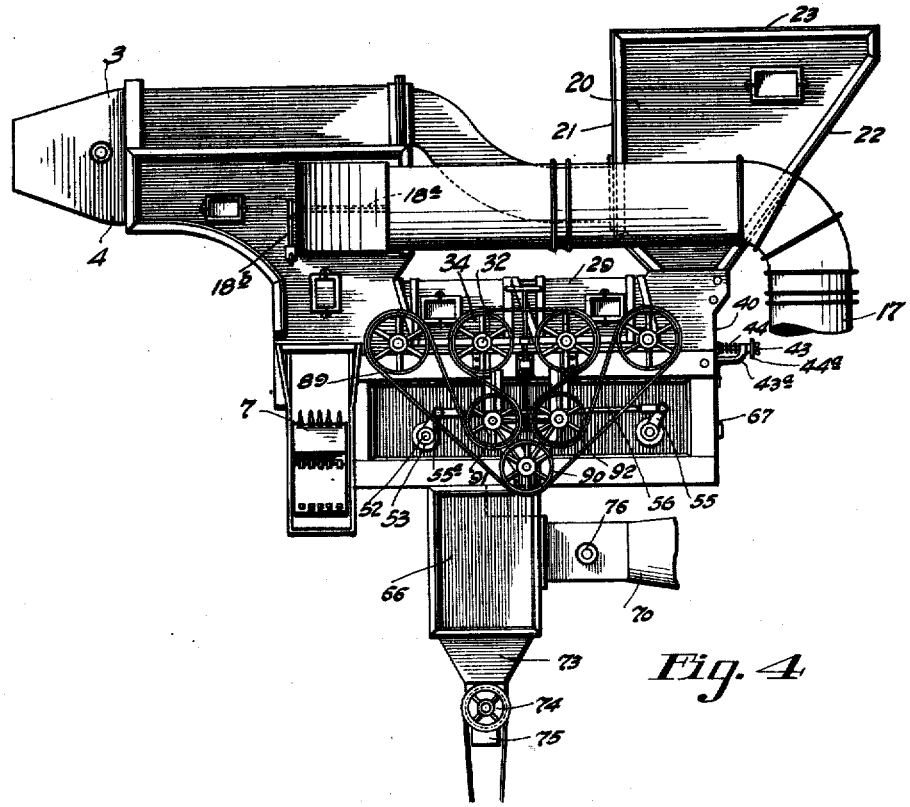
Fig. 4 is the reverse side elevation of Fig. 2, the screen bed being in operating position in this view.

The cleaning cylinders 30 and 31 are all caused to rotate in the same direction indicated by arrows in Fig. 1, this being accomplished as shown in Fig. 4, by the manner in which an endless driving belt 89 is caused to pass around their respective driving pulleys 34 and about the idler pulleys 90, 91 and 92. A pulley 93 (see Fig. 2) on the shaft of the cylinder 30 constitutes the main driving pulley being driven by a belt 94. A pulley 95 on the shaft of the forward cylinder 31 serves, by means of a belt 96, to drive the pulley 26 for the beater.

The several cylinders 30 and 31 are formed by a plurality of toothed castings comprising curved narrow base strips 97 (see Figs. 7 and 8) which extend the length of the cylinder and are connected thereto by bolts 98, each base carrying along one edge a raised flange 99 adapted to overlap the side edge of the next adjacent base strip. The teeth 35 or 36 are cast integral with these bases and the holes for the securing bolts are arranged so as to not interfere with the staggered disposition of the teeth of the several rows on the cylinder.

In operation, as the cotton enters the opening chamber 20 it is opened up by the beaters 24 and the foreign matter partly separated therefrom. The cotton and foreign matter work down the incline wall 22 responsive to the suction draft through pipe 70 and fall between the teeth 35 and 37. These teeth are so shaped and disposed that the cotton will pass freely between them but sticks or trash will be ground up between the teeth. When pieces of metal are encountered, the beveled character of the teeth and the yielding breaker-bar 38 will permit the article to pass without serious damage. The cotton and foreign matter is whipped over the screen by the cylinder 30 while subjected to a strong down draft and most of the foreign matter is separated at this first operation so that in a comparatively clean state the cotton is caught and passed again and again over the screen bed by the cylinders 31 to make certain that it has been thoroughly cleaned before it passes through the opening 77 to the distributer 7. The light clean cotton will have a tendency to float through the cleaning chamber and be distributed to the several cleaning cylinders, the distance traveled being proportionate to its relative lightness, and it, therefore, will not necessarily be passed between the first cylinder and the breaker-bar but all foreign matter and dirty cotton which is made heavy thereby will be caught by the cylinders 30 and passed over the whole screen. All foreign matter cleaned from the cotton passes with the suction draft downwardly through the hopper below the screen to the dust separator through which it passes with a centrifugal whirl under the partition 72 so that the heavier foreign matter will be separated from the air which passes to the pipe 70 while the separated matter falls into the pockets of the ejector 74. To clean or inspect the screen, I open the rear door 67, release the catches 61 permitting the hopper wall 62 to drop and move the handle 57 to lower the screen bed by its supporting cams until in position to be drawn out of the door on its roller supports 68. The manner of construction of the sectional cylinders makes them both dust and air proof.

The apparatus is provided at suitable points with doors and windows giving opportunity of access and inspection at the points needed. When the cleaner is to be cut out of service, the crank 88 is manipulated to reverse the positions of the valves 2 and 6, raising the former to its dotted line position in order to close the intake end of the passage 3 and lowering the latter valve to tightly close the port 77 into the cleaning chamber. The valve 18 is opened and the valve 76 is closed, whereupon the feed of cotton to the distributer 7 takes place in the ordinary manner.

It is understood that the construction illustrated is merely exemplary of the principles of construction and operation of my present invention and, therefore, it may be varied to suit different operating conditions within the scope and meaning of the following claims.

Having thus described my invention, what I claim as new and desire to secure by Letters Patent, is:—

1. In a cotton cleaner, a cotton opening chamber having an outlet for the opened cotton in its lower portion, means to feed the cotton to said chamber, and a fast spinning beater therein to receive and forcibly throw the entering cotton upwardly with a substantial free flight through the spacious upper portion of the chamber to separate and open up the cotton locks and free heavier foreign matter therefrom.

2. In a cotton cleaner, a cotton opening chamber enlarged overhead and having an intermediate cotton inlet and a contracted bottom cotton outlet, suction feed means tending to pass cotton directly from said inlet to said outlet through said opening chamber, a fast spinning beater disposed to intercept the entering cotton and knock it forcibly upwardly out of the path of the air current, and means to direct the falling cotton in said chamber to said outlet, substantially as described.

3. In a cotton cleaner, a cotton opening chamber enlarged overhead and having an intermediate cotton inlet and a bottom cotton outlet, suction feed means to pass cotton through said opening chamber, a fast spinning beater disposed in the path of the entering cotton and adapted to knock it forcibly upwardly out of the path of the air current, and against the walls of the enlarged overhead chamber and means to direct the falling cotton in said chamber past said beater to said discharge opening, said chamber being substantially wider than the inlet and said beater comprising deflecting blades adapted to knock the cotton both upwardly and laterally to distribute it in its flight substantially uniformly throughout the enlarged upper portion of the chamber.

4. In a cotton cleaner, an opening chamber, means to feed cotton thereto, a fast spinning beater element therein adapted to receive the entering cotton and drive it forcibly against the upper walls of said chamber which are sufficiently spaced from said element to provide a substantial free flight for the cotton, and cleaning mechanism into which the cotton is fed from said opening chamber, substantially as described.

5. In a cotton cleaner, an opening chamber having a contracted lower portion, means to feed cotton thereto, a fast spinning beater working in said lower portion and adapted to receive the entering cotton and drive it forcibly against the upper walls of said chamber which are sufficiently spaced from said element to provide a substantial free flight for the cotton, and cleaning mechanism into which the cotton and the foreign matter freed therefrom is fed from said opening chamber, substantially as described.

6. In a cotton cleaner, an opening chamber enlarged overhead, means to feed the cotton thereto in a mass, a fast spinning beater in the lower portion of said chamber adapted to receive and throw the cotton upwardly through the spacious upper portion of said chamber, there being a bottom outlet from the chamber from which the opened cotton passes, and a cleaning mechanism to separate the foreign matter from the opened cotton, substantially as described.

7. In a cotton cleaner, a main cleaner casing comprising a plurality of rotatable toothed cylinders and screening thereunder, an overhead cotton opening chamber from which the cotton passes to the cleaner casing, said opening chamber having a hopper bottom and being enlarged overhead, and a relatively small fast spinning beater disposed in the lower part of said chamber and adapted to engage the entering cotton and throw it forcibly in all directions upwardly through said opening chamber before it enters the main cleaner casing, substantially as described.

8. In a cotton cleaner, a suction feed passage for the uncleaned cotton, a cotton opening chamber having its lower portion forming an enlarged portion of said passage, a fast spinning beater to strike the cotton entering said lower portion and throw it through the spacious upper portion of said chamber, and a cleaning apparatus into which the opened cotton passes from said chamber, substantially as described.

9. In a cotton cleaner, a suction feed passage for the cotton, a cotton opening chamber into which said passage opens, a cleaning chamber below and communicating at one end with the opening chamber, a rotary beater working in the opening chamber to open up the mass of entering cotton, rotating toothed cylinders working in the cleaning chamber, screening over which said cylinders work, an outlet for the cleaned cotton, and a suction outlet passage leading from below the screening in said cleaning chamber, the initial cylinder only being disposed in the direct line of the draft through the cleaning chamber, substantially as described.

10. In a cotton cleaner, a casing, a rotatable cleaner therein, a screen for the cleaner, releasable supports for the screen, and a door in the casing for the withdrawal bodily of the screen.

11. In a cotton cleaner, a casing, a rotatable cleaning element, a concave screen over which said cleaning element forces the cotton, adjustable supports for the screen, and a door in the casing for the removal of the screen when adjusted to a predetermined position.

12. In a cotton cleaner, a cleaning chamber, a series of rotating toothed cylinders working therein, a screen bed below said cylinders carrying concave screen pockets under the cylinders, means to adjust said bed toward and from the cylinders, and an outlet door for the removal of the screen bed when lowered to clear the cylinders.

13. In a cotton cleaner, a cleaning chamber, a series of rotating toothed cylinders working therein, a screen bed below said cylinders carrying concave screen pockets under the cylinders, means to adjust said bed toward and from the cylinders, an outlet door for the removal of the bed when disposed to clear the cylinders, and a hopper below said screen bed comprising a wall movable to permit the removal of the bed.

14. In a cotton cleaner, a cleaning chamber, a plurality of rotating toothed cylinders therein, a screen bed having concave screen pockets which fit under the cylinders, a hopper wall detachably connected to one end of the screen bed and inclined toward an outlet port in the bottom of said chamber, mechanism to raise and lower the screen bed, and a door for the removal of the screen bed in its lower position.

15. In a cotton cleaner, rotatable toothed elements, screening below the elements, cams forming the supports for said screening, and mechanism to move the cams to adjust the screening toward and from the rotatable elements, substantially as described.

16. In a cotton cleaner, rotatable toothed elements, a screen bed below the elements, cams forming the supports for said bed, mechanism to move the cams together to adjust the bed bodily toward and from said elements, and means to limit the adjustment of said bed toward the rotatable elements.

17. In a cotton cleaner, rotatable toothed elements, a screen bed below the elements, cams wholly supporting said bed, mechanism to move the cams in unison to raise the bed, means to limit the adjustment of said bed toward the rotatable elements, and means to lock the cams with the bed in raised position.

18. In a cotton cleaner comprising a plurality of toothed cleaner elements, a removable sliding screen bed disposed under said elements, cams forming slides and adjustable supports for said bed in its operating position, and means for operating the cams in unison to adjust the bed toward said toothed elements, substantially as described.

19. In a cotton cleaner, a plurality of toothed elements, concave screening under said elements, a movable bed carrying said screening, cams adjustably supporting said bed, means connecting the cams for joint operation, said means comprising a shaft extending through the cleaner and carrying the cams near one end thereof, overhung bearings in the sides of the casing carrying the cams at the other end of the casing, means to connect all the cams for joint manipulation, an inclined false bottom in the chamber detachably connected at one end of the screen bed and adapted when detached to fall clear of said overhung cam bearings, and a door for the removal of the lowered screen bed.

20. In a cotton cleaner, a rotatable toothed cleaning element therein, a screen below said means, cams for adjusting said screen, antifriction rollers carried by said cams and adapted to support the screen in its lowered position, and a door for the removal of the screen, substantially as described.

21. In combination, a suction feed mechanism for cotton gins comprising a conveyer passage, a by-pass leading from and returning to said passage, valves for both ends of said by-pass, adjustable operating mechanism to simultaneously open or close both ends of said by-pass, and cotton cleaning mechanism in said by-pass.

22. In combination, a suction feed pipe for cotton, an opening chamber through which the cotton first enters, mechanism therein to open up the cotton, a cotton cleaning mechanism communicating at one end with the opening chamber, a screen partition in said cleaning apparatus, rotatable toothed elements working over said screen, a hopper below the screen, a dust separator into which said hopper discharges, a suction pipe connected to the dust separator and acting to induce an air current from the opening chamber through the adjacent end of the screen partition into the hopper, and a cotton feeder which receives the cotton from said cleaning apparatus, said cotton feeder comprising means to prevent the breaking of the vacuum in said cleaning apparatus, substantially as described.

23. In a cotton cleaner, a rotatable toothed cylinder, a cleaner casing in which the cylinder rotates, a breaker-bar hingedly mounted in the casing opposite the cylinder and carrying heavy metallic teeth, spring means mounted on the casing and yieldably holding the breaker-bar in coöperative relationship with said toothed cylinder, and suction means to draw the cotton between said bar and cylinder.

24. In a cleaner casing having a rotatable toothed element mounted therein, a breaker-bar hingedly mounted in an opening in the casing, means to pack the joint between the breaker-bar and casing, a spring, means to mount said spring on the casing in position to engage the free end of the breaker-bar and urge it to closed position in said casing, teeth on the breaker-bar co-acting with the teeth on said rotatable toothed element, and suction means to draw the cotton directly between the teeth of said bar and element.

25. In a cotton cleaner, a cleaning chamber having a cotton inlet at one end and a cotton outlet at the other end, a series of rotatable toothed members mounted in said chamber and substantially spaced from the top thereof, screening under said toothed members, and means to produce a direct air draft downwardly from the cotton inlet past the first toothed member and through the screening, leaving the space above the other toothed members in said chamber normally free from forcible down drafts, substantially as described.

26. In a cotton cleaner, a main cleaner casing comprising a plurality of toothed elements and a screen over which they successively pass the cotton, in combination with a cotton opening chamber disposed above and communicating at one end with said cleaning chamber, suction feed means to introduce cotton into the lower portion of said cleaning chamber, and means to cause the suction draft to pass down through the cleaning chamber, said opening chamber being enlarged overhead and having a straight inclined outer wall sloping toward the point of communication with the main cleaner casing, and a fast spinning beater disposed in the path of the entering cotton and rotatable in a direction to engage and throw it forcibly through the enlarged upper portion of the cleaner chamber.

27. In a cotton cleaning mechanism, an opening chamber, a cotton induction port of substantially less width than the opening chamber, means to feed cotton through said port, and a fast spinning beater disposed to receive the cotton and throw it forcibly through the opening chamber, said beater comprising flattened blades inclined in opposite directions from the center line of the entering cotton toward each end of the opening chamber, substantially as described.

28. In a cotton opener, an opening chamber enlarged overhead and having a relatively narrow cotton inlet passage, a fast spinning beater opposite said passage and comprising a beater shaft, and a plurality of beater blades, each blade having one end rounded and inserted through the shaft and the opposite end flattened, the flattened ends of the beater blades being inclined in opposite directions from the center line of the entering cotton.

29. The combination with a main cleaning chamber having a series of toothed elements rotatable therein, a screen bed under said elements, a cotton feeder adapted to preserve the vacuum and communicating with the discharge end of said cleaning chamber, suction feed means to introduce the cotton at the opposite end of said cleaning chamber, a suction passage leading from below the screen bed in said chamber, and means interposed in the suction feed line to said chamber to fully open the cotton, the top wall of the cleaner chamber being spaced substantially above rotatable cleaning elements therein to afford ample space for the lighter cotton to float therethrough, the initial cleaning element being a toothed cylinder disposed in the direct line of the suction through the cleaning chamber.

In testimony whereof I affix my signature.

ROBERT S. MUNGER.

Witness:
NOMIE WELSH.

Copies of this patent may be obtained for five cents each, by addressing the "Commissioner of Patents, Washington, D. C."